US012739149B2

(12) United States Patent
Nandy et al.

(10) Patent No.: US 12,739,149 B2
(45) Date of Patent: Sep. 15, 2026

(54) PROGRAMMING STATIC MULTICAST ROUTES INLOAD-BALANCED NETWORKS

(71) Applicant: HEWLETT PACKARD ENTERPRISE DEVELOPMENT LP, Spring, TX (US)

(72) Inventors: Tathagata Nandy, Bangalore (IN); Anil Raj, Bangalore (IN)

(73) Assignee: Hewlett Packard Enterprise Development LP, Spring, TX (US)

(*) Notice: Subject to any disclaimer, the term of this patent is extended or adjusted under 35 U.S.C. 154(b) by 68 days.

(21) Appl. No.: 18/897,859

(22) Filed: Sep. 26, 2024

(65) Prior Publication Data

US 2026/0039498 A1 Feb. 5, 2026

(30) Foreign Application Priority Data

Jul. 31, 2024 (IN) ............................ 202441058032

(51) Int. Cl.

| | |
|---|---|
| ***G06F 15/173*** | (2006.01) |
| ***H04L 12/18*** | (2006.01) |
| ***H04L 45/16*** | (2022.01) |
| ***H04L 47/125*** | (2022.01) |

(52) U.S. Cl.

CPC ........ *H04L 12/1886* (2013.01); *H04L 12/185* (2013.01); *H04L 45/16* (2013.01); *H04L 47/125* (2013.01)

(58) Field of Classification Search

CPC ......... H04L 45/16; H04L 45/22; H04L 45/66; H04L 45/245; H04L 47/125; H04L 49/15

See application file for complete search history.

(56) References Cited

U.S. PATENT DOCUMENTS

| | | | | |
|---|---|---|---|---|
| 8,995,275 B1 * | 3/2015 | Iovine | H04L 45/16 | 370/252 |
| 2006/0018333 A1 * | 1/2006 | Windisch | H04L 12/1877 | 370/242 |
| 2009/0135820 A1 * | 5/2009 | Suzuki | H04L 45/60 | 370/390 |
| 2024/0137307 A1 * | 4/2024 | N | H04L 12/4641 | |

* cited by examiner

*Primary Examiner* — Yves Dalencourt

(74) *Attorney, Agent, or Firm* — Hewlett Packard Enterprise Patent Department

(57) ABSTRACT

A network device in a network is provided. During operation, the network device can receive a static multicast route associated with a multicast group and a source of the multicast group. Here, the network device can include a plurality of ingress interfaces, each corresponding to a path via which the network device is reachable from the source. The network device can determine, based on an indicator in the static multicast route, that the network device is to dynamically select an ingress interface for the static multicast route. The network device can then determine respective weights allocated to the plurality of ingress interfaces and select the ingress interface for the static multicast route from the plurality of ingress interfaces based on their respective weights. Subsequently, the network device can program the static multicast route in forwarding hardware of the network device with the selected ingress interface.

18 Claims, 10 Drawing Sheets

COMPUTER-READABLE MEDIUM
700

INSTRUCTIONS TO RECEIVE, BY NETWORK DEVICE, STATIC MULTICAST ROUTE ASSOCIATED WITH MULTICAST GROUP AND SOURCE OF MULTICAST GROUP, NETWORK DEVICE COMPRISING PLURALITY OF INGRESS INTERFACES, EACH CORRESPONDING TO PATH VIA WHICH COMPUTER SYSTEM IS REACHABLE FROM SOURCE
710

INSTRUCTIONS TO DETERMINE, BASED ON INDICATOR IN STATIC MULTICAST ROUTE, THAT NETWORK DEVICE IS TO DYNAMICALLY SELECT INGRESS INTERFACE FOR STATIC MULTICAST ROUTE
712

INSTRUCTIONS TO DETERMINE RESPECTIVE WEIGHTS ALLOCATED TO PLURALITY OF INGRESS INTERFACES
714

INSTRUCTIONS TO SELECT INGRESS INTERFACE FOR STATIC MULTICAST ROUTE FROM PLURALITY OF INGRESS INTERFACES BASED ON THEIR RESPECTIVE WEIGHTS
716

INSTRUCTIONS TO PROGRAM STATIC MULTICAST ROUTE IN FORWARDING HARDWARE OF NETWORK DEVICE WITH SELECTED INGRESS INTERFACE
718

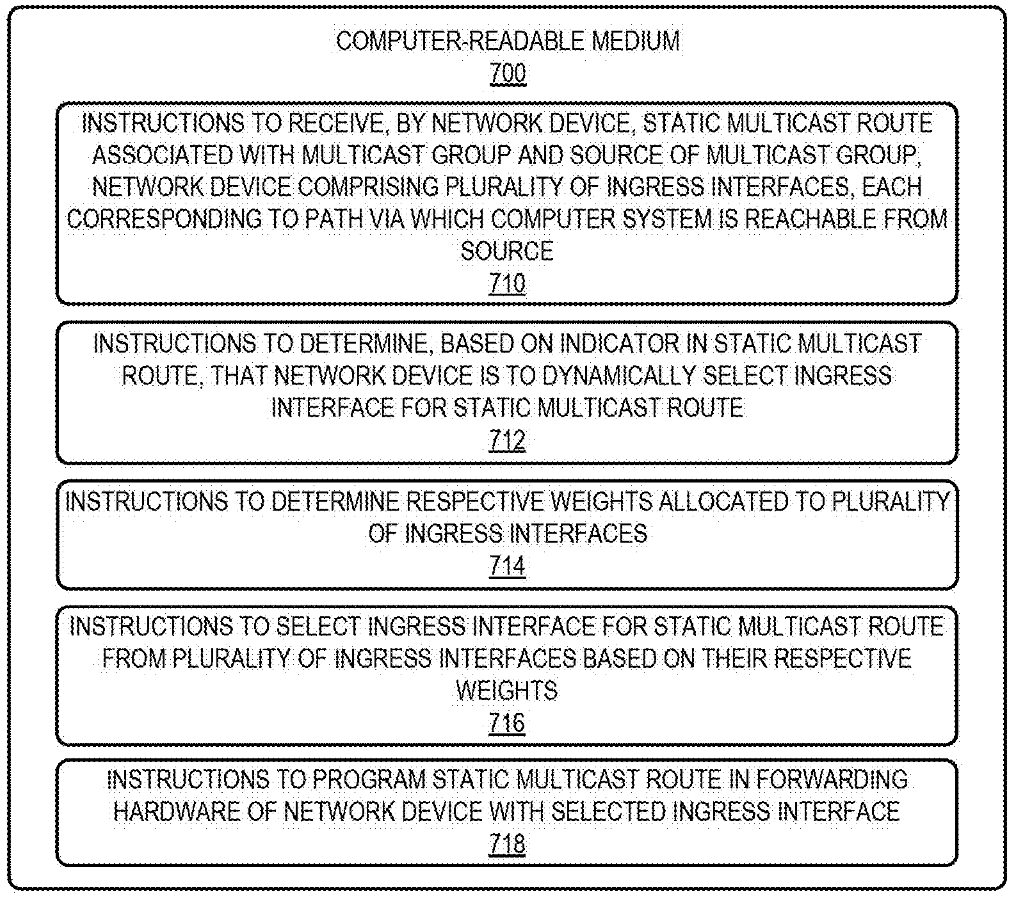

FIG. 7

PROGRAMMING STATIC MULTICAST ROUTES INLOAD-BALANCED NETWORKS

BACKGROUND

A network device, such as a switch, may be deployed in different network topologies. For example, the network device can be deployed in a load-balanced network where the network device can be reachable from an upstream device via at least two equal-cost paths. The upstream device can then distribute traffic to the network device among the paths and balance the traffic load to the network device.

BRIEF DESCRIPTION OF THE FIGURES

FIG. 7 illustrates an example of a computer-readable medium (CRM) facilitating efficient programming of static multicast routes in a load-balanced network, in accordance with an aspect of the present application.

In the figures, like reference numerals refer to the same figure elements.

DETAILED DESCRIPTION

Figure 1A:
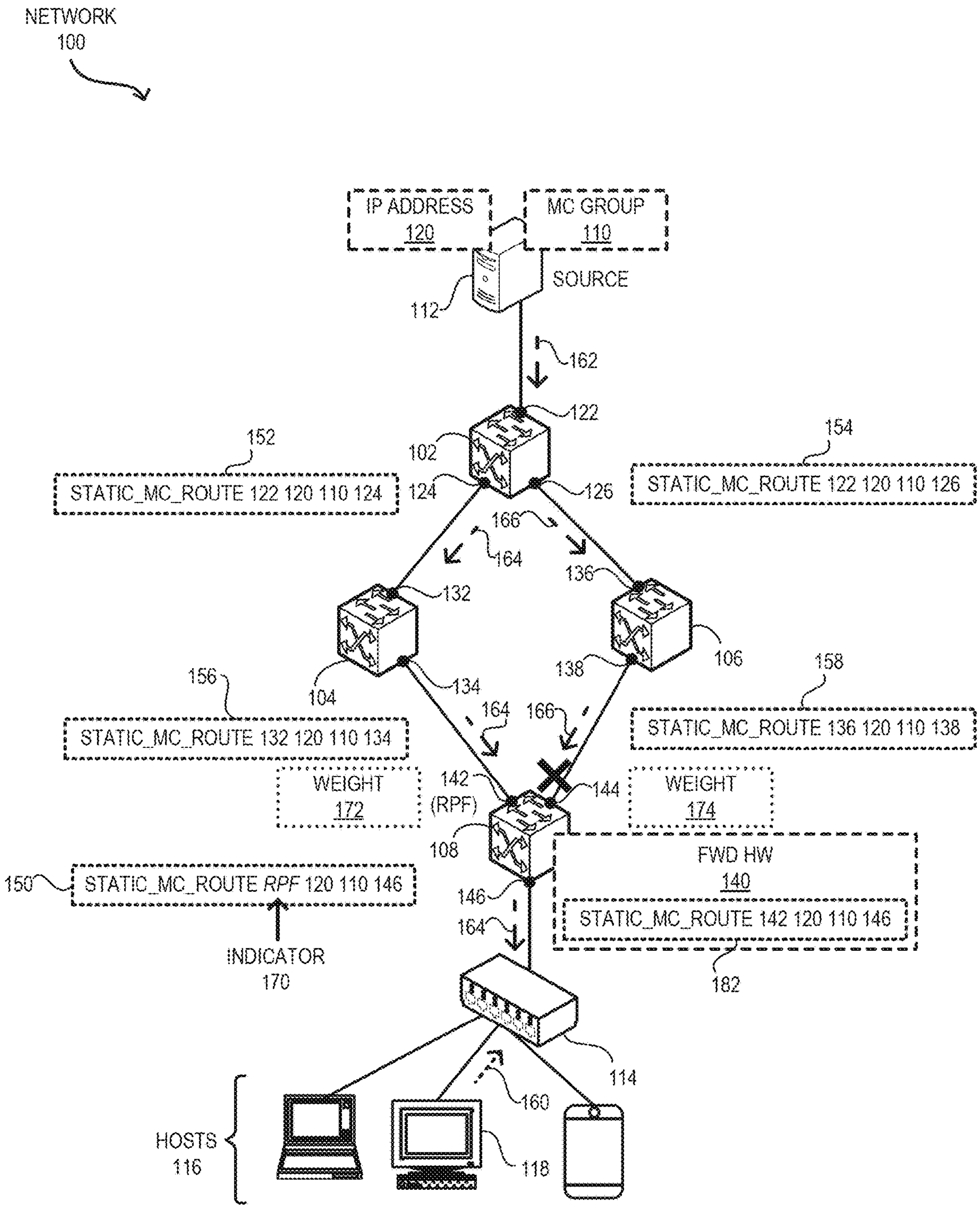
FIG. 1A illustrates an example of a load-balanced network supporting efficient programming of static multicast routes, in accordance with an aspect of the present application.

In various Internet applications, multicast is frequently used to distribute content from a source to multiple hosts via one or more network devices, such as switches. Efficient distribution of multicast traffic can improve the performance of a network. A network-layer multicast protocol, such as protocol-independent multicast (PIM), can be used for distributing content in a heterogeneous network. In some scenarios, a host can send a client join request (e.g., an Internet Group Management Protocol (IGMP) join request or a Multicast Listener Discovery (MLD) join request) to an to a network device, which can couple the host, to receive traffic of a multicast group. This network device can be referred to as a requesting network device.

The requesting network device can send a network join request (e.g., a Protocol-Independent Multicast (PIM) join request) to a source network device coupling the source of the multicast group. The source network device can then start forwarding multicast traffic from the source to the requesting network device. In a load-balanced network, the source network device is coupled to the source of the multicast group via at least two equal-cost multiple paths (ECMPs). Since PIM can dynamically determine multicast routes, PIM can determine the multicast route among the ECMPs even when one of the paths becomes unavailable. However, if the multicast routes are statically programmed, selecting the path among the ECMPs can be challenging.

The aspects described herein address the problem of efficiently programming static multicast routes at a network device in a load-balanced network by (i) detecting, in the static route, an indicator indicating that the network device is to select an ingress interface corresponding to a path in the ECMPs; and (ii) selecting the ingress interface based on respective weights of the ingress interfaces corresponding to the ECMPs. Here, the network device can include a plurality of ingress interfaces, each corresponding to a path in the ECMPs. For a respective multicast group, the network device can select the ingress interface with the lower weight and program the static multicast route entry with the selected ingress interface in the forwarding hardware. As a result, traffic received via the selected ingress interface is forwarded to downstream hosts.

Currently, if a high-volume and high-subscription multicast data flow (e.g., the video streaming of a football game) is anticipated, a static multicast route entry (e.g., a layer-3 route entry) can be configured at the network devices instead of relying on a dynamic protocol, such as PIM. Such an entry is programmed and removed based on user configuration. For example, an administrator may anticipate that hosts coupled to a network device may request the multicast data flow. Accordingly, to configure the static multicast route entry, an administrator may issue a command to the network device (e.g., from a network management system, such as a network orchestrator). When the software, such as the operating system, of the network device receives the configuration, the network device can program forwarding hardware with the entry. The entry typically specifies the ingress interface, the source, the multicast group, and the egress interface.

In a load-balanced network, there can be at least two equal-cost paths (i.e., ECMPs) between the source of the multicast group and the network device. To ensure the flow of multicast traffic from the source to the requesting hosts, respective static multicast entries can be programmed on a respective network device of each of the ECMPs of the load-balanced network. As a result, if one of the ECMPs becomes unavailable, the multicast traffic can still be forwarded via another path. However, because each of the ECMPs can be configured with the static multicast route entries, the multicast traffic from the source can be forwarded by the network devices on all ECMPs to the network device. Consequently, the network device may receive duplicate multicast traffic via the ECMPs and forward the duplicate multicast traffic to the hosts.

In addition, because the network device can be a downstream device of the load-balanced network, the ECMPs can converge at the network device. Therefore, the network device can include respective static multicast entries corresponding to the ECMPs for forwarding multicast traffic to the hosts. Each entry can include an ingress interface coupling a corresponding path of the load-balancing network (i.e., a path in the ECMPs). Hence, a plurality of static multicast entries can be programmed at the network device, each with a corresponding ingress interface associated with a path of the load-balancing network. Since the hosts coupling the network device may request multicast traffic from different multicast groups, programming multiple static multicast entries for a respective multicast group can lead to inefficient use of the limited hardware resources of the network device.

To address this issue, the network device can support an indicator (e.g., a keyword) in a static multicast route indicating that the network device is to select an ingress interface from the plurality of ingress interfaces corresponding to the ECMPs. The network device can then program a static multicast entry with the selected ingress interface for forwarding traffic to the requesting hosts coupling the network device and may avoid traffic duplication. During operation, instead of programming multiple static entries at the network device, the administrator can provide a configuration command for a single static multicast route entry specifying the indicator as an ingress interface. The network device can maintain corresponding weights for the ingress interfaces. A respective weight can be represented by a corresponding counter (e.g., integer values). Upon detecting the indicator in the static multicast entry, the network device can select an ingress interface based on the weights. Here, the network device can select the ingress interface with the lesser weight. When the ingress interface is selected, the network device can increment the weight of the selected interface.

The network device can then program the static multicast entry with the selected ingress interface in the forwarding hardware. The static multicast entry can specify the selected ingress interface, the IP address of the source, the multicast IP address of the multicast group, and the egress interface. Here, the egress interface can couple one or more hosts anticipated to request traffic from the multicast group. Accordingly, incoming multicast traffic from the source (i.e., indicated by the IP address of the source) is accepted only by the selected ingress interface and forwarded via the egress interface. The multicast traffic received at the other ingress interface(s) can be discarded. As a result, the traffic is no longer duplicated at the hosts. Furthermore, a single static entry can be sufficient to represent all paths of the load-balanced network, which can ensure efficient utilization of the hardware resources of the network device.

In some examples, the indicator can be "rpf," which can typically refer to a reverse-path forwarding (RPF) interface. Each network device can recognize an RPF interface for an IP address. The RPF interface can represent the shortest-path egress interface to an IP address. This shortest path is calculated by the routing protocol running on the network device and is maintained in the routing table. When there are ECMPs to an IP address, all paths in the ECMPs can be the shortest path. Under such circumstances, one of the corresponding interfaces can typically be selected as the RPF interface based on one or more selection criteria. For example, the interface with the lower (or higher) interface number can be selected as the RPF interface.

However, instead of referring to the RPF interface as an ingress interface, the keyword "rpf" in the static multicast entry can operate as an indicator. When the static multicast entry specifies the "rpf" as the ingress interface, the network device can detect it as the indicator and initiate the selection process for the ingress interface. Furthermore, the weights allocated to the ingress interfaces can allow the network device to distribute the static multicast entries for different multicast groups among the ingress interfaces of the ECMPs. Suppose that each ingress interface can be allocated an initial weight (e.g., a value of zero).

Since the initial weights of the ingress interfaces can be equal (i.e., a value of zero), the network device can select the RPF interface as the ingress interface for the static multicast entry. Hence, the RPF interface can be the "tiebreaker" when the weights of the ingress interfaces are equal. The network device can then increment the value of the weight of the RPF interface to one. Here, the weight of the other ingress interface (e.g., the non-RPF interface) can remain zero. As a result, the weights of the respective ingress interfaces can become unequal. When the network device detects the indicator in a new static multicast entry, the network device can determine that the weight of the non-RPF interface has a lower value in comparison with the weight of the RPF interface. Accordingly, the non-RPF interface with the lesser weight can be selected as the ingress interface for the new static multicast entry. In this way, the network device can select the ingress interface with the lowest weight from the plurality of ingress interfaces. Subsequently, the weight of the non-RPF interface can be incremented to one. At this point, the weights of the ingress interfaces can be equal again (i.e., a value of one). The network device can then select the RPF interface as the ingress interface for the next static multicast entry.

In some examples, the weights may also be represented by non-integer (e.g., floating point) values. When an ingress interface is selected, the corresponding weight can then be increased by a predetermined value (e.g., a value of 0.1). Alternatively, the weights can be initialized with a large value where the network device can select the ingress interface with the higher weight. The network device can still select the RPF interface as the tiebreaker. If the maximum number of static routes supported by the network device is N, the large value can be N+1. Under such circumstances, when the network device selects an ingress interface, the network device can reduce the weight of the selected ingress interface by a predetermined value. In this way, the traffic loads of different multicast groups are distributed among the ingress interfaces associated with different paths of the load-balanced network.

In this disclosure, the term "switch" is used in a generic sense, and it can refer to any standalone network device or fabric switch operating in any network layer. "Switch" should not be interpreted as limiting examples of the present invention to layer-2 networks. Any device that can forward traffic to an external device or another switch can be referred to as a "switch." Furthermore, if the switch facilitates communication between networks, the switch can be referred to as a gateway switch. Any physical or virtual device (e.g., a virtual machine or switch operating on a computing device) that can operate as a network device and forward traffic to an end device can be referred to as a "switch." If the switch is a virtual device, the switch can be referred to as a virtual switch. Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1A illustrates an example of a load-balanced network supporting efficient programming of static multicast routes, in accordance with an aspect of the present application. A network 100 can include a number of network devices (e.g., switches), and may include network components, such as layer-2 and layer-3 hops, and tunnels. In some examples, network 100 can be an Ethernet network, InfiniBand network, or other network, and may use a corresponding communication protocol, such as IP, FibreChannel over Ethernet (FCoE), or other protocol. Network 100 can include a number of network devices 102, 104, 106, and 108. A respective network device in network 100 can be associated with a MAC address and an IP address and can include at least one processing resource. Examples of a processing resource can include, but are not limited to, a processor core, a graphics processing unit (GPU), and a tensor processing unit (TPU).

Often, a high-volume and high-subscription multicast data flow (e.g., video streaming of a football game, a popular program, or a speech) can be anticipated at a predetermined time. Suppose that the flow is from a multicast group 110. In this example, end device 112 can be a source for multicast group 130. Hence, end device 112 can also be referred to as source 112. In this example, a number of requesting hosts 116 for multicast group 110 can be coupled to network device 108 via interface 146 through an external network device 114 (e.g., a layer-2 switch). Based on the presence of hosts 116, the multicast data flow of multicast group 110 can be anticipated to flow from network device 102 toward network device 108. Because the initiation and termination of the data flow of multicast group 110 can be known beforehand, a static multicast route can be configured in network 100. The static multicast route can ensure that the network devices in network 100 can readily start forwarding when the multicast data flow becomes available. Because of its static nature, the static multicast route can be added and removed by an administrator. Hence, the entries associated with the static multicast route may not time out.

Instead of relying on a dynamic protocol, such as PIM, the static multicast route entries can be programmed and removed based on user configuration. For example, the administrator may anticipate hosts 116 may request the multicast data flow of multicast group 110. Accordingly, to configure the entries, an administrator may issue a command to a respective network device, such as network device 108, of network 100. When the software, such as the operating system, of network device 108 receives the configuration, network device 108 can program forwarding hardware 140 with the entry. The entry typically specifies the ingress interface, IP address 120 of source 112, multicast group 110, and the egress interface.

If network 100 is a load-balanced network, there can be at least two ECMPs between source 112 and network device 108, which can couple hosts 116. One of the ECMPs between source 112 and network device 108 can be via network devices 102 and 104. Another one of the ECMPs can be via network devices 102 and 106. To ensure the flow of multicast traffic from source 112 to hosts 116, respective static multicast entries can be programmed on a respective network device of each of the ECMPs of network 100. Source 112 can be coupled to network device 102 via interface 122. Downstream network devices 104 and 106 can be coupled to network device 102 via interfaces 124 and 126, respectively, of network device 102. Since the multicast traffic of multicast group 110 can be received via interface 122, it can be the ingress interface. Network device 102 can then forward the traffic to network devices 104 and 106 since they are the next-hop devices on respective ECMPs.

Hence, a static multicast route 152 can be programmed on network device 102 with interface 122 as the ingress interface, IP address 120 as the source address, multicast group 110, and interface 124 as the egress interface. Based on route 152, network device 102 can forward the multicast traffic of multicast group 110 to network device 104 via interface 124. Furthermore, another static multicast route 154 can be programmed on network device 102 with interface 122 as the ingress interface, IP address 120 as the source address, multicast group 110, and interface 126 as the egress interface. Based on route 154, network device 102 can forward the multicast traffic of multicast group 110 to network device 106 via interface 126. To program routes 152 and 154, an administrator can provide respective configuration commands (e.g., from a network management system) for programming routes 152 and 154 on network device 102. The software of network device 102 can maintain routes 152 and 154 in the memory of network device 102 and program them in the forwarding hardware of network device 102.

Network device 104 can be coupled to network devices 102 and 108 via interfaces 132 and 134, respectively, of network device 104. Accordingly, a static multicast route 156 can be programmed on network device 104 with interface 132 as the ingress interface, IP address 120 as the source address, multicast group 110, and interface 134 as the egress interface. Based on route 156, network device 104 can forward the multicast traffic of multicast group 110 to network device 108 via interface 134. Moreover, network device 106 can be coupled to network devices 102 and 108 via interfaces 136 and 138, respectively, of network device 106. Hence, a static multicast route 158 can be programmed on network device 106 with interface 136 as the ingress interface, IP address 120 as the source address, multicast group 110, and interface 138 as the egress interface. Based on route 158, network device 106 can forward the multicast traffic of multicast group 110 to network device 108 via interface 136.

As a result, if the path via network device 104 becomes unavailable, the multicast traffic can still be forwarded over the path via network device 106. However, because both network devices 104 and 106 can be configured with static multicast entries 156 and 158, respectively, the multicast traffic from source 112 can be forwarded by network devices 104 and 106 to network device 108. Consequently, network device 108 may receive duplicate multicast traffic of multicast group 110 via network devices 104 and 106 and forward the duplicate multicast traffic to hosts 116.

In addition, because network device 108 can be a downstream device of network devices 104 and 106, the ECMPs of network 100 can converge at network device 108. Accordingly, network device 108 can be coupled to network devices 104 and 106 via interfaces 142 and 144, respectively, of network device 108. Therefore, network device 108 may include two static multicast entries for multicast group 110 with ingress interfaces 142 and 144. Programming multiple static multicast entries for the same multicast group 110 can lead to inefficient use of the limited resources of forwarding hardware 140.

To address this issue, network device 108 can determine an indicator 170, which can be a keyword (e.g., a predetermined phrase), in a static multicast route 150 and initiate an ingress interface selection process for receiving multicast traffic via the ECMPs of network 100. Instead of programming multiple static entries on network device 108, the administrator can provide a configuration command for a single route 150 specifying indicator 170 as the ingress interface. In some examples, indicator 170 can be the phrase "rpf." Route 150 can include IP address 120 and multicast group 110. Typically, network device 108 can determine the phrase "rpf" as a reference to the RPF interface to IP address 120. However, when detected in route 150, network device 108 can detect the phrase "rpf" as indicator 170 for initiating the ingress interface selection process for route 150. Furthermore, route 150 can include egress interface 146 since hosts 116 are reachable via interface 146. The software of network device 108 can maintain entry 150 comprising indicator 170 in the memory of network device 108. Upon detecting indicator 170 in entry 150, network device 108 can initiate the ingress interface selection process.

To select the ingress interface, network device 108 can maintain corresponding weights 172 and 174 for ingress interfaces 142 and 144. In some examples, network device 108 can maintain respective counters for representing weights 172 and 174. Network device 108 can select an ingress interface from ingress interfaces 142 and 144 based on respective weights 172 and 174. When network device 108 receives a client join request 160 for multicast group 110 from a host 118 in hosts 116, network device 108 can determine that entry 150 corresponding to multicast group 110 is maintained in the memory. Hence, network device 108 can program static multicast route entry 182 with the selected ingress interface in forwarding hardware 140. In some examples, entry 182 can be a Ternary Content Addressable Memory (TCAM) entry. Instead of indicator 170 (i.e., the phrase "rpf"), entry 182 can specify selected ingress interface 142. In addition, static multicast entry 182 can include IP address 120, multicast group 110, and egress interface 146.

In this example, weights 172 and 174 can have an equal value. As a tiebreaker, network device 108 can select the RPF interface as the ingress interface for entry 182. Suppose that the RPF interface on network device 108 for IP address 120 is interface 142, which can be the interface corresponding to the shortest path from network device 108 to IP address 120. Hence, network device 108 can send unicast traffic to IP address 120 via interface 142. Accordingly, entry 182 can specify interface 142 as the ingress interface. Subsequently, weight 172 of selected interface 142 can be incremented. If the current value of weights 172 and 174 is X, upon selection of interface 142, the values can become X+1 and X, respectively. For example, initial values of weights 172 and 174 can be zero (e.g., X=0). Network device 108 can then select RPF interface 142 as the ingress interface for entry 182. Hence, RPF interface 142 can be the "tiebreaker" when weights 172 and 174 have equal values. Network device 108 can then increment weight 172 to one (e.g., X+1). Here, weight 174 of ingress interface 144 can remain zero (e.g., X=0). As a result, weight 174 can become less than weight 172.

When source 112 starts sending multicast traffic 162, network device 102 can forward respective copies 164 and 166 of traffic 162 via interfaces 124 and 126, respectively, based on corresponding routes 152 and 154. Subsequently, network devices 104 and 106 can forward traffic 164 and 166, respectively, to network device 108 based on corresponding routes 156 and 158. Hence, network device 108 can receive copies of the same traffic from network devices 104 and 106 via interfaces 142 and 144, respectively. Based on entry 182, traffic 164 can be accepted by ingress interface 142 and forwarded via egress interface 146. On the other hand, traffic 166 received at ingress interface 144 can be discarded (denoted with a cross). As a result, the multicast traffic of multicast group 110 may not be duplicated at hosts 116. Furthermore, a single static multicast entry 182 can be sufficient to represent multicast group 110 for all paths of network 100, which can ensure efficient utilization of the resources of forwarding hardware 140.

Figure 1B:
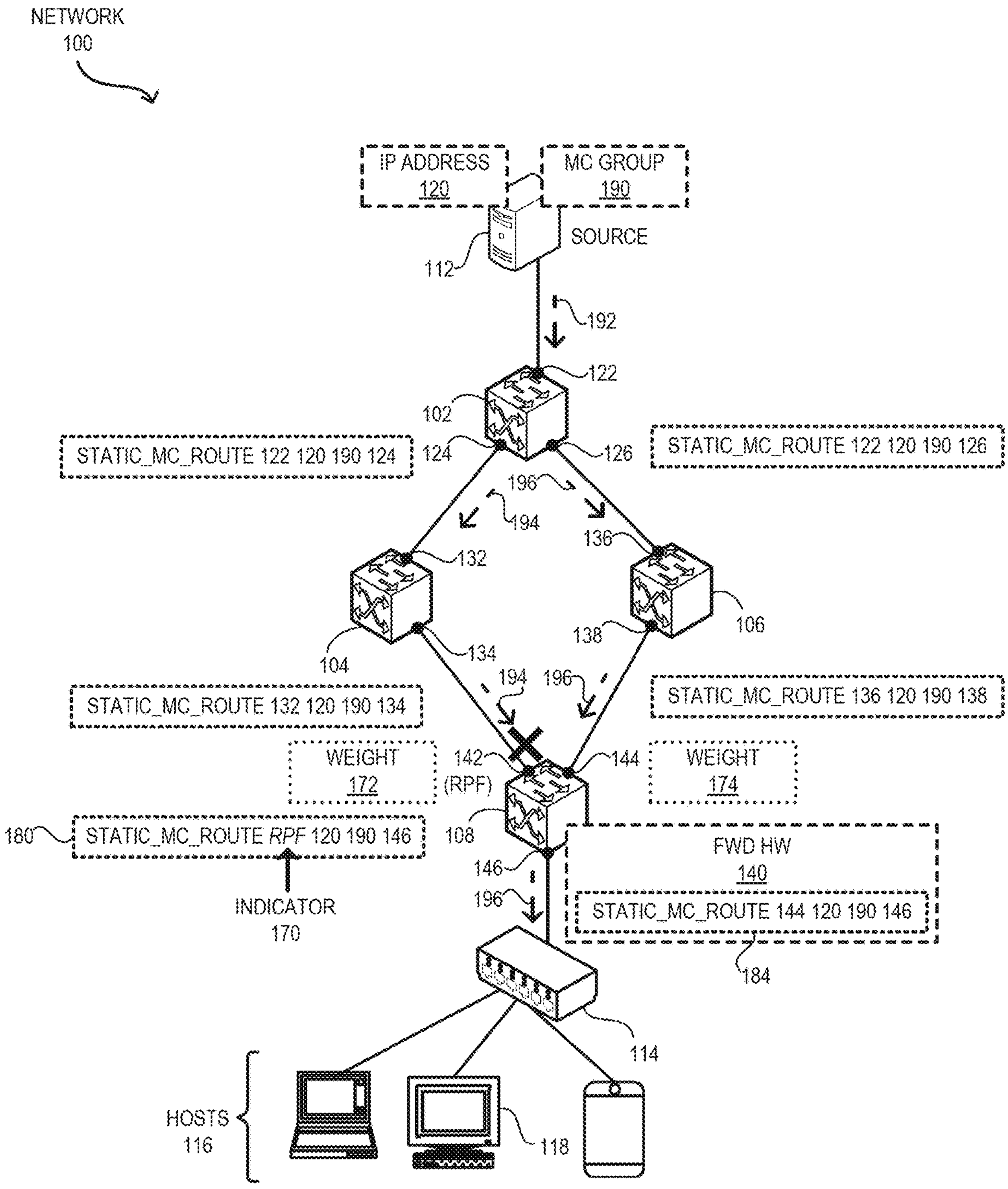
FIG. 1B illustrates an example of distributing static multicast routes in a load-balanced network, in accordance with an aspect of the present application.

FIG. 1B illustrates an example of distributing static multicast routes in a load-balanced network, in accordance with an aspect of the present application. If end device 112 is the source for another high-subscription multicast group 190. Based on the presence of hosts 116 coupling network device 108, the multicast data flow of multicast group 190 can be anticipated to flow from network device 102 toward network device 108. Hence, respective static multicast routes for IP address 120 and multicast group 190 can be programmed on a respective network device of the ECMPs between source 112 and end device 108. For example, the administrator can provide a configuration command for a single route 180. The configuration command can include a number of input parameters, such as an ingress interface, the IP address of the source, the multicast group, and an egress interface. The configuration command can specify indicator 170 (e.g., the phrase "rpf") as the input parameter corresponding to the ingress interface.

Route 180 can include IP address 120 and multicast group 190. Furthermore, route 180 can include egress interface 146 since hosts 116 are reachable via interface 146. The software of network device 108 can maintain entry 180 comprising indicator 170 in the memory of network device 108. Upon detecting indicator 170 in entry 180, network device 108 can initiate the ingress interface selection process. Network device 108 can select an ingress interface from ingress interfaces 142 and 144 based on respective weights 172 and 174. Network device 108 can then program static multicast route entry 184 with the selected ingress interface in forwarding hardware 140. Instead of indicator 170, entry 184 can specify the selected ingress interface. In addition, static multicast entry 184 can include IP address 120, multicast group 190, and egress interface 146.

In the example in FIG. 1A, when network device 108 allocates interface 142 as the ingress interface for multicast group 110, the values of weights 172 and 174 can become X+1 and X, respectively. Suppose that, upon selecting interface 142, the values of weights 172 and 174 are one and zero, respectively. Hence, weight 174 can have a lesser value than weight 172. Consequently, network device 108 can select interface 144, which is associated with weight 174, as the ingress interface for entry 184. Therefore, network device 108 can select ingress interface 144 since it is the one with the lowest weight. Accordingly, entry 184 can specify interface 144 as the ingress interface. Subsequently, weight 174 of selected interface 144 can be incremented where the values of weights 172 and 174 can become X+1. If the values of weights 172 and 174 are one and zero, respectively, prior to the allocation of ingress interface 144 for entry 184, the values of weights 172 and 174 can both become one (i.e., X+1) after the allocation of ingress interface 144 for entry 184. Here, weights 172 and 174 can become equal. As a result, if the administrator specifies indicator 170 in a static multicast route for another multicast group, network device 108 may select interface 142 as the ingress interface since it can be the RPF interface. In this way, interfaces 142 and 144 can be distributed among the static multicast routes of different multicast groups.

When source 112 starts sending multicast traffic 192, network device 102 can forward respective copies 194 and 196 of traffic 192 via interfaces 124 and 126, respectively, based on corresponding routes. Subsequently, network devices 104 and 106 can forward traffic 194 and 196, respectively, to network device 108. Hence, network device 108 can receive copies of the same traffic of multicast group 190 from network devices 104 and 106 via interfaces 142 and 144, respectively. Based on entry 184, traffic 196 can be accepted by ingress interface 144 and forwarded via egress interface 146. On the other hand, traffic 194 received at ingress interface 142 can be discarded (denoted with a cross). As a result, the multicast traffic of multicast group 190 may not be duplicated at host 116. Furthermore, static multicast entry 184 can be sufficient to represent multicast group 190 for all paths of network 100.

Figure 2:
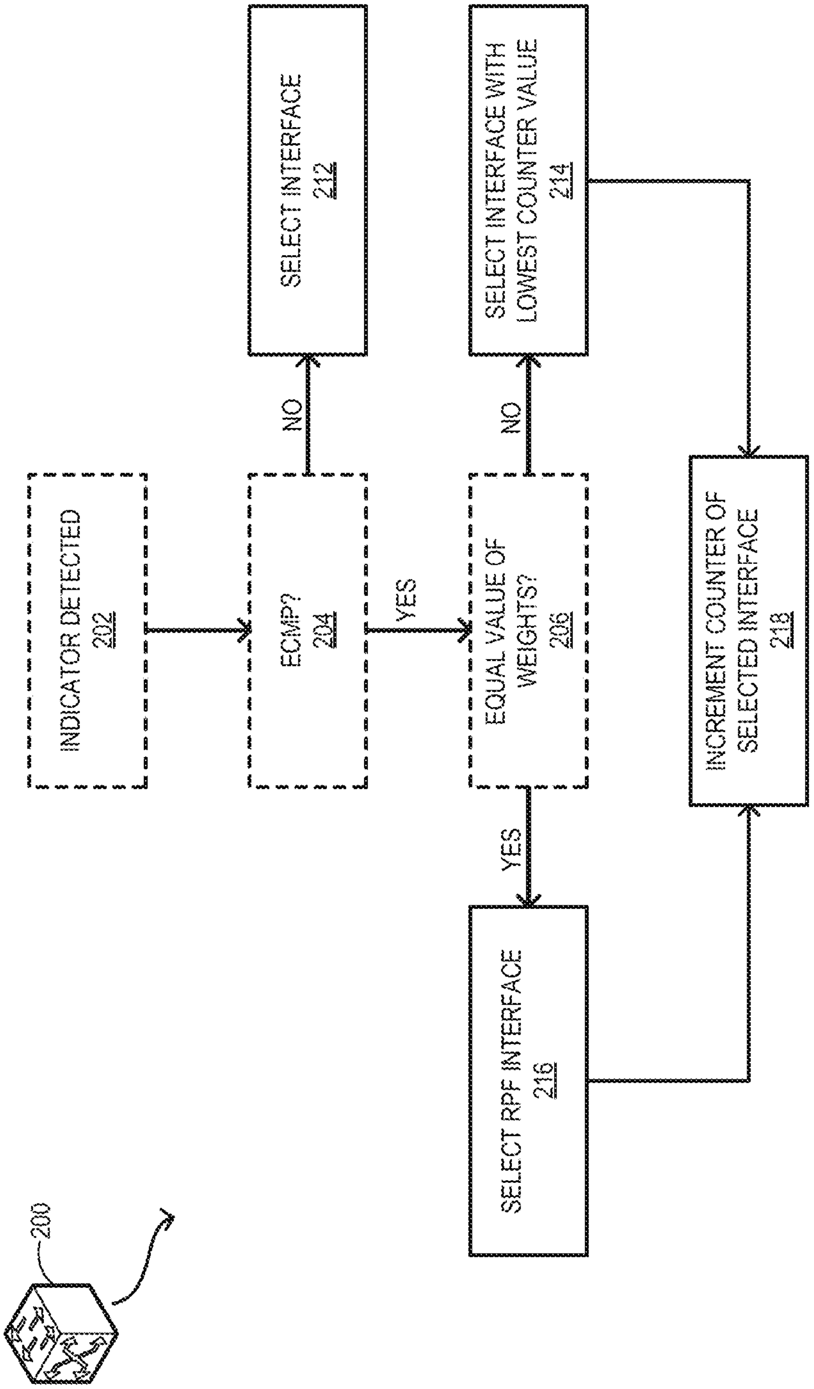
FIG. 2 illustrates an example of selecting a path for a static multicast route in a load-balanced network, in accordance with an aspect of the present application.

FIG. 2 illustrates an example of selecting a path for a static multicast route in a load-balanced network, in accordance with an aspect of the present application. During operation, a network device 200 can detect an indicator in a static multicast route (operation 202). The static multicast route can include the indicator, which can include a keyword (e.g., a predefined phrase), such as "rpf," as an ingress interface. An RPF interface for an IP address indicates the shortest-path interface to that IP address. This interface is determined by the routing protocol running on network device 200. Therefore, the RPF interface can be the egress interface for packets destined to the IP address. Since network device 200 can recognize an RPF interface, even without initiating the interface selection process in a load-balanced network, the RPF interface can be a valid ingress interface for the static multicast route.

Hence, network device 200 can determine whether it has multiple ingress interfaces corresponding to ECMPs in the load-balanced network (operation 204). If network device 200 does not have multiple ingress interfaces, the RPF interface can indicate the shortest-path interface to the IP address of the source specified in the static multicast route. Therefore, network device 200 can select the RPF interface as the ingress interface (operation 212). In the example in FIG. 1A, even when network devices 104 and 106 are in a load-balanced network, these network devices do not have ECMPs to source 112. Hence, if the administrator configures a static multicast route on network device 104 (or network device 106) with indicator 170 as the ingress interface, network device 104 can select the RPF interface to IP address 120 (e.g., interface 132).

On the other hand, network device 200 can be reachable via ECMPs in the network (e.g., network device 108 in FIG. 1A). Hence, network device 200 can include multiple ingress interfaces. Network device 200 can then select an ingress interface for the static multicast route. For the selection process, network device 200 can determine whether the respective weights associated with the ingress interfaces have an equal value (operation 206). If the weights have equal values, network device 200 can select the RPF interface to the IP address of the source indicated in the static multicast route (operation 216), as described in conjunction with FIG. 1A. On the other hand, if the weights have unequal values, network device 200 can select the interface with the lowest weight (operation 214), as described in conjunction with FIG. 1B.

Upon selecting the interface, network device 200 can increment the weight of the selected interface (operation 218). In the example in FIG. 1A, when the RPF interface, which is interface 142, is selected, the value of weight 172 is incremented. Consequently, weight 174 has become the weight with a lesser value, causing network device 108 to select interface 144 for another multicast group, as described in conjunction with FIG. 1B. Subsequently, weight 174 can be incremented. The incremented value of weight 174 can then match the value of weight 172. In this way, network device 200 can select different ingress interfaces for respective static multicast routes associated with different multicast groups for the same set of ECMPs.

Figure 3A:
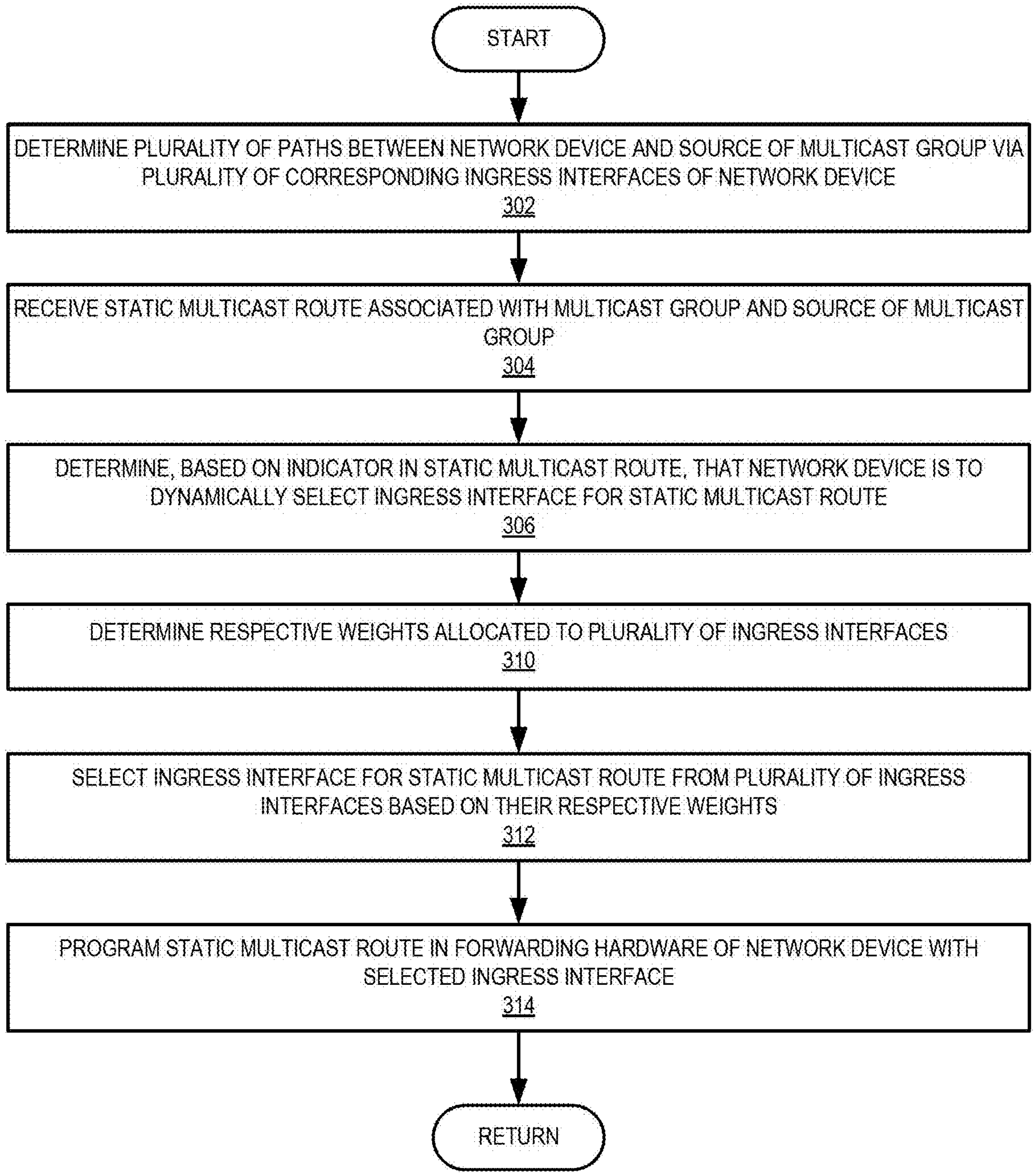
FIG. 3A presents a flowchart illustrating an example of a process of a network device programming a static multicast route in a load-balanced network, in accordance with an aspect of the present application.

FIG. 3A presents a flowchart illustrating an example of a process of a network device programming a static multicast route in a load-balanced network, in accordance with an aspect of the present application. During operation, the network device can determine a plurality of paths between the network device and the source of a multicast group via a plurality of corresponding ingress interfaces of the network device (operation 302). For example, when the routing protocol of the network device determines the paths to the source, the routing protocol can determine that there are multiple equal-cost paths, each associated with a different interface, to the source. In the example of FIG. 1A, network device 108 can determine there are two ECMPs between source 112 and network device 108, and these paths are associated with interfaces 142 and 144.

The network device can receive a static multicast route associated with a multicast group and a source of the multicast group (operation 304). The network device may receive a configuration command, which can be supported by the network device, from an administrator for configuring the static multicast route. The configuration command can indicate the multicast group by its multicast IP address and the source by its IP address. In the example in FIG. 1A, network device 108 can receive a static multicast route 150. The network device can then determine, based on an indicator in the static multicast route (e.g., indicator 170 in static multicast route 150 of FIG. 1A), that the network device is to dynamically select an ingress interface for the static multicast route (operation 306). In some examples, the indicator can include the phrase "rpf." The phrase "rpf" can typically refer to the RPF interface to an IP address. However, instead of referring to the RPF interface as an ingress interface, the phrase "rpf" in the static multicast entry can operate as the indicator. When the static multicast route specifies "rpf" as the ingress interface, the network device can detect it as the indicator and initiate the selection process for the ingress interface.

The network device can then determine the respective weights allocated to the plurality of ingress interfaces (operation 310). The network device can allocate respective initial weights (e.g., a value of 0) to the ingress interfaces. In the example in FIG. 1A, interfaces 142 and 144 can be allocated with weights 172 and 174, respectively. The network device can then select the ingress interface for the static multicast route from the plurality of ingress interfaces based on their respective weights (operation 312). The network device can compare the respective values of the weights with each other and select the interface accordingly. In the examples in FIGS. 1A and 1B, network device 108 can select the ingress interface from interfaces 142 and 144 based on weights 172 and 174, respectively.

Upon selecting the ingress interface, the network device can program the static multicast route in the forwarding hardware of the network device with the selected ingress interface (operation 314). Programming in the forwarding hardware can include generating a static multicast route entry (e.g., a TCAM entry) in the forwarding hardware of the network device. In this way, even though the source of the multicast group can be reachable via a plurality of ingress interfaces, the forwarding hardware may include a single static multicast route entry for the multicast group. It should be noted that even though the static multicast route may specify the indicator as the ingress interface, the entry in the forwarding hardware can specify the selected ingress interface. In the example in FIG. 1A, forwarding hardware 140 of network device 108 can include entry 182 comprising interface 142, which has been selected based on weights 172 and 174.

Figure 3B:
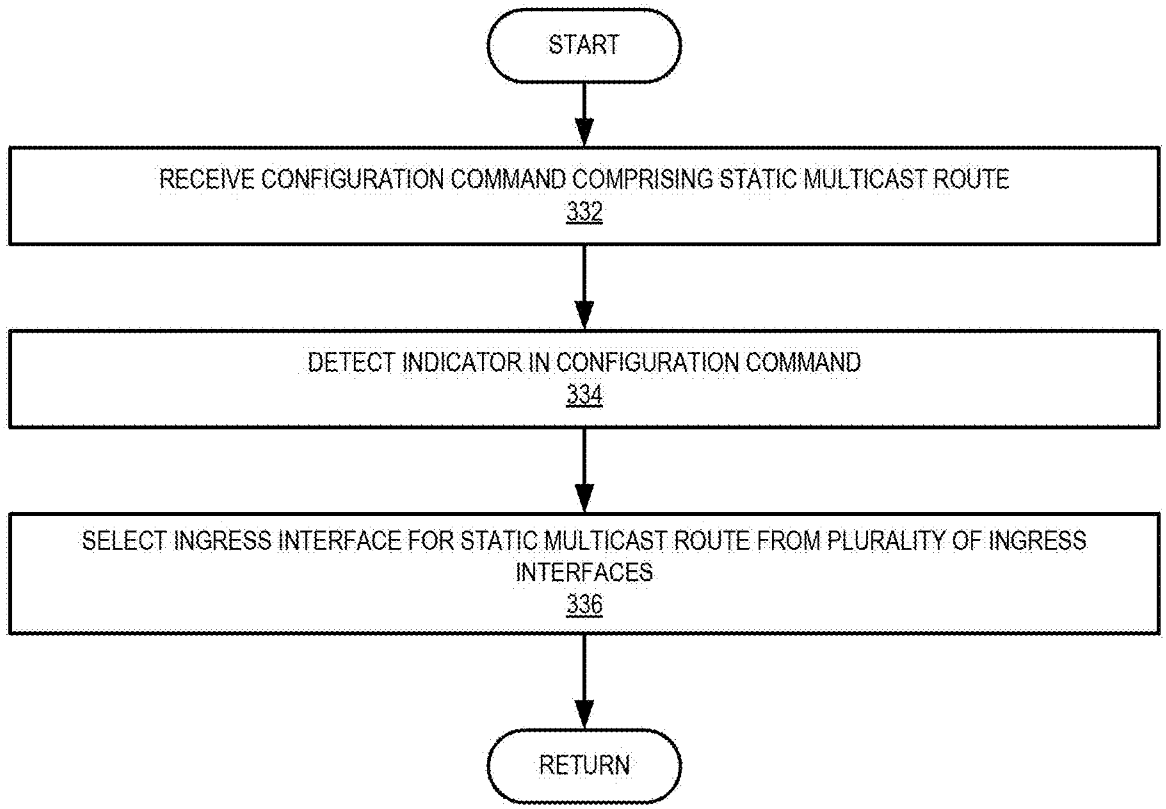
FIG. 3B presents a flowchart illustrating an example of a process of a network device initiating an ingress interface selection process for programming a static multicast route in a load-balanced network, in accordance with an aspect of the present application.

FIG. 3B presents a flowchart illustrating an example of a process of a network device initiating an ingress interface selection process for programming a static multicast route in a load-balanced network, in accordance with an aspect of the present application. During operation, the network device can receive a configuration command comprising the static multicast route with the indicator (e.g., the static multicast route of FIG. 3A) (operation 332). An administrator may issue the configuration command from a network management system (e.g., a network orchestrator). The configuration command can be supported by the network device and cause the network device to program its forwarding hardware with the static multicast route. The configuration command can include a particular format and order in which the parameters of the configuration command may appear. For example, the configuration command can specify a set of input parameters, which can be, in order, the ingress interface, the source's IP address, the multicast group, and the egress interface (e.g., as shown in entry 150 of FIG. 1A).

The network device can then detect the indicator in the configuration command (e.g., indicator 170 in FIG. 1A) (operation 334). The configuration command can specify the indicator as the input parameter corresponding to the ingress interface. The indicator can include a keyword (e.g., a predefined phrase), such as "rpf," as the input parameter corresponding to the ingress interface for the static multicast route. Subsequent to detecting the indicator, the network can initiate the ingress interface selection process. Accordingly, the network device can select the ingress interface for the static multicast route from the plurality of ingress interfaces (operation 336). In the examples in FIG. 1A, network device 108 can select interface 142 as the ingress interface from interfaces 142 and 144 for programming entry 182 in forwarding hardware 140.

Figure 3C:
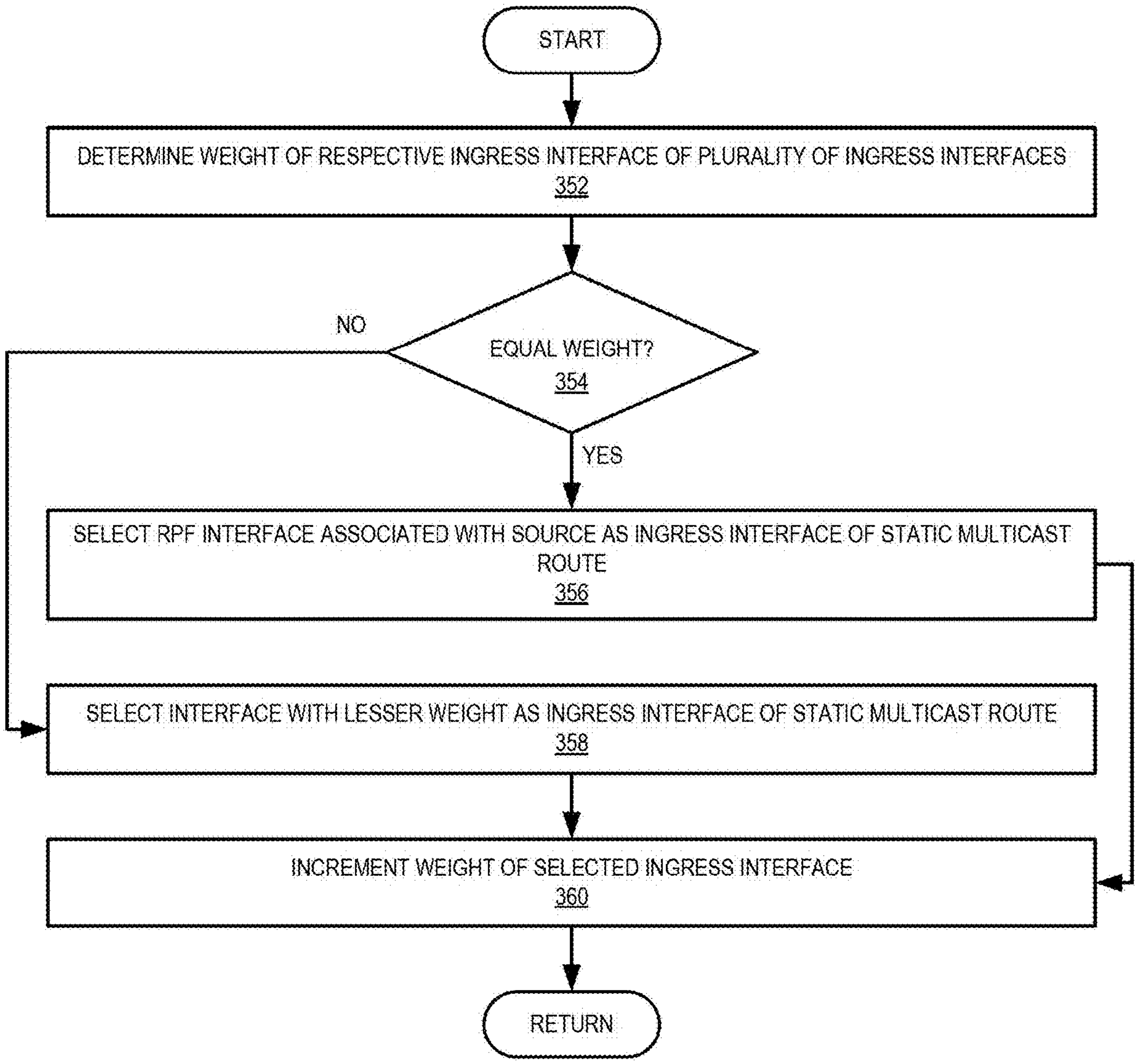
FIG. 3C presents a flowchart illustrating an example of a process of a network device selecting an ingress interface for programming a static multicast route in a load-balanced network, in accordance with an aspect of the present application.

FIG. 3C presents a flowchart illustrating an example of a process of a network device selecting an ingress interface for programming a static multicast route in a load-balanced network, in accordance with an aspect of the present application. During operation, the network device can determine the weight of a respective ingress interface of the plurality of ingress interfaces (e.g., the interfaces of FIG. 3A) (operation 352). Since the weights of the ingress interfaces can dictate which interface to select, the network device can determine the corresponding weights, such as weights 172 and 174 of FIGS. 1A and 1B. The network device can then determine whether the respective weights associated with the ingress interfaces have an equal value (operation 354).

If the weights have equal values, the network device can select the RPF interface associated with the source as the ingress interface of the static multicast route (operation 356). In the example in FIG. 1A, weights 172 and 174 can have an equal value. Therefore, network device 108 can select interface 142, which can be the RPF interface to IP address 120 of source 112, as the ingress interface for static multicast route 150. On the other hand, if the weights have unequal values, the network device can select the interface with the lesser weight as the ingress interface for the static multicast route (operation 358). In the example in FIG. 1B, weight 174 can have the lowest value among weights 172 and 174. Therefore, network device 108 can select interface 144, which can be associated with weight 174, as the ingress interface for static multicast route 180.

Upon selecting the interface (operation 456 or 358), the network device can increment the weight of the selected ingress interface (operation 360). In the example in FIG. 1A, when the RPF interface, which is interface 142, is selected, the value of weight 172 is incremented. Consequently, weight 174 has become the weight with a lesser value (i.e., with the lowest value among weights 172 and 174), causing network device 108 to select interface 144 for another multicast group, as described in conjunction with FIG. 1B. Subsequently, weight 174 can be incremented. The incremented value of weight 174 can then match the value of weight 172. In this way, the network device can select different ingress interfaces for respective static multicast routes associated with different multicast groups for the same set of ECMPs.

Figure 4:
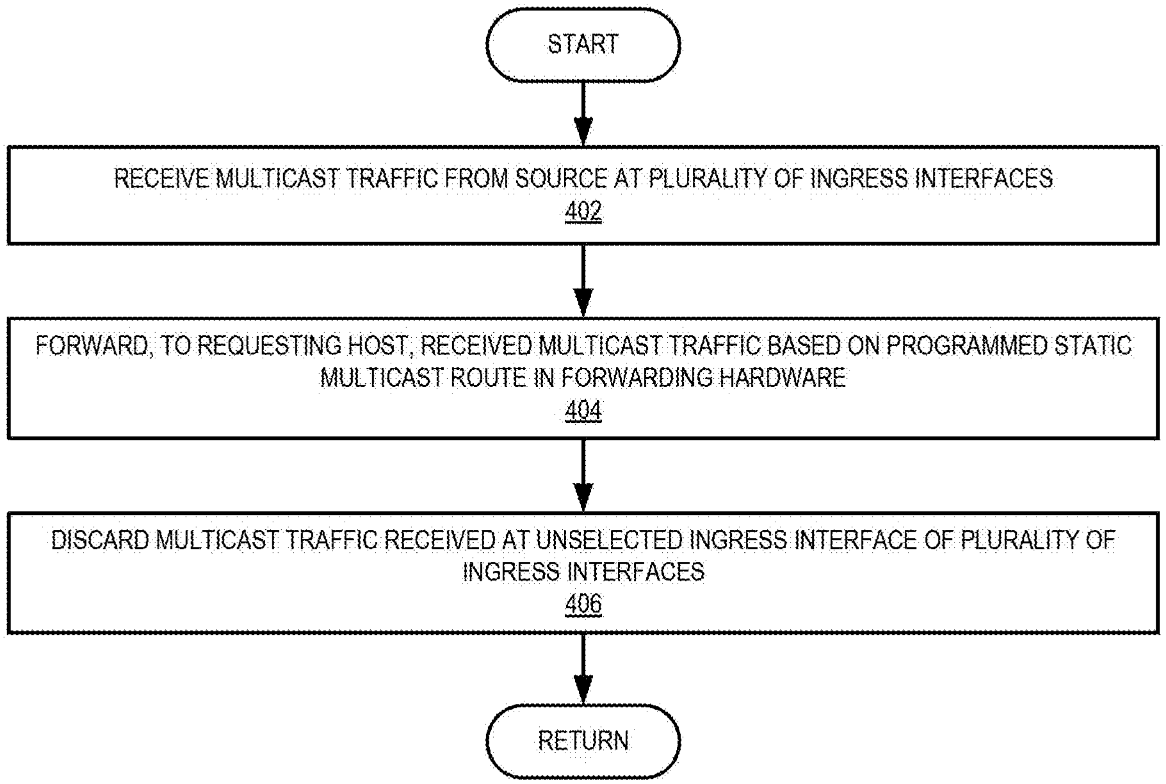
FIG. 4 presents a flowchart illustrating an example of a process of a network device forwarding multicast traffic received via a static multicast route selected in a load-balanced network, in accordance with an aspect of the present application.

FIG. 4 presents a flowchart illustrating an example of a process of a network device forwarding multicast traffic received via a static multicast route selected in a load-balanced network, in accordance with an aspect of the present application. During operation, the network device can receive multicast traffic from the source at the plurality of ingress interfaces (e.g., the ingress interfaces of FIG. 3A) (operation 402). A respective network device of a respective path in the ECMPs in a load-balanced network can be programmed with a static multicast route associated with a multicast group. Therefore, the multicast traffic from the source can be forwarded to the network device via a respective path of the ECMPs. The plurality of ingress interfaces can then receive the multicast traffic from the corresponding paths. In the example in FIG. 1A, interfaces 142 and 144 can receive multicast traffic 164 and 166 via corresponding paths.

The network device can then forward, to a requesting host, the received multicast traffic based on the programmed static multicast route in the forwarding hardware (operation 404). The network device may select an ingress interface from the plurality of ingress interfaces and program the forwarding hardware with the selected interface as the ingress interface. As a result, the multicast traffic received at the selected ingress interface can match the corresponding entry in the forwarding hardware. The network device can then forward the multicast traffic received at the selected ingress interface to the egress interface indicated in the entry. Since this egress interface can correspond to the requesting host, the multicast traffic is forwarded to the requesting host. The network device, therefore, can discard the multicast traffic received at the unselected ingress interface of the plurality of ingress interfaces (operation 406). In the example in FIG. 1A, network device 108 can forward multicast traffic 164 received at interface 142 to hosts 116 via egress interface 146 and discard multicast traffic 164 received at interface 144.

Figure 5:
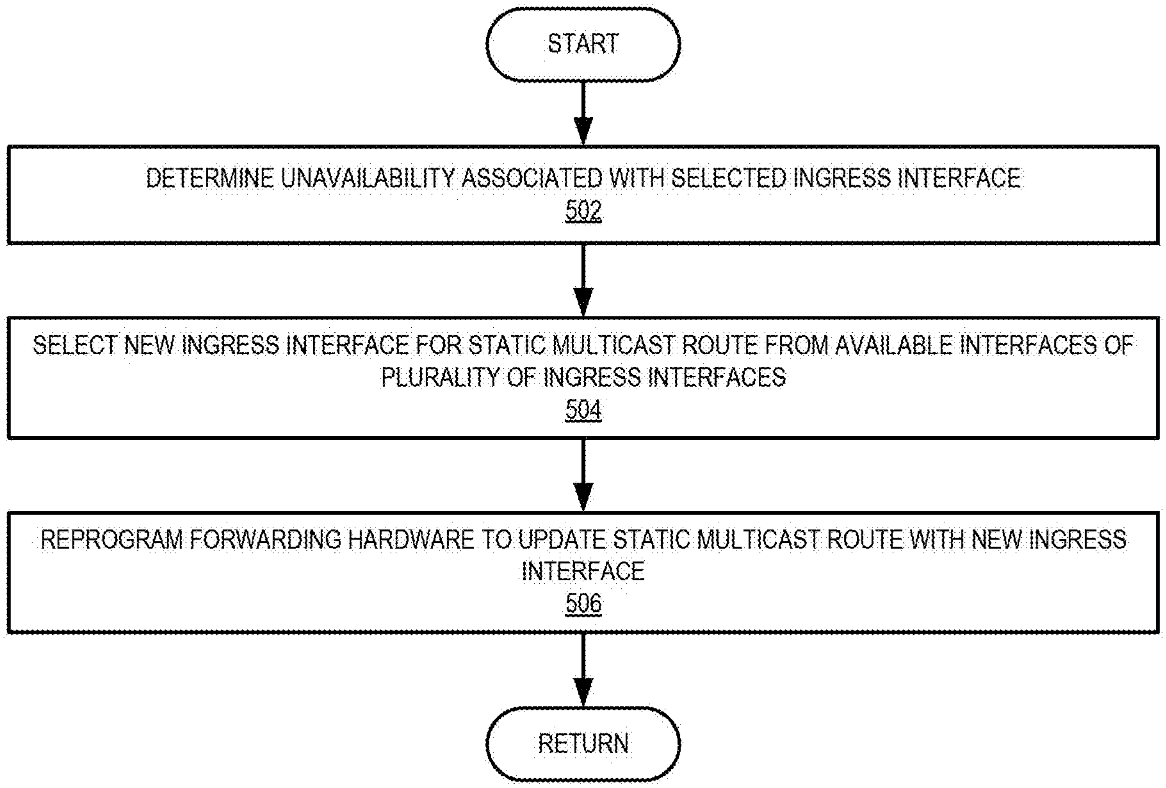
FIG. 5 presents a flowchart illustrating an example of a process of a network device reselecting an ingress interface for programming a static multicast route in a load-balanced network subsequent to the unavailability of another ingress interface, in accordance with an aspect of the present application.

FIG. 5 presents a flowchart illustrating an example of a process of a network device reselecting an ingress interface for programming a static multicast route in a load-balanced network subsequent to the unavailability of another ingress interface, in accordance with an aspect of the present application. During operation, the network device can determine unavailability associated with the selected ingress interface (e.g., the selected ingress interface of FIG. 3A) (operation 502). The network device may detect a link or node failure associated with the selected ingress interface and determine the unavailability. In the example in FIG. 1A, network device 108 may detect the unavailability associated with ingress interface 142 (e.g., due to a link failure on the corresponding path in network 100 or a failure at network device 104).

The network device can then select a new ingress interface for the static multicast route from the available interfaces of the plurality of ingress interfaces (operation 504). If more than one interface is available, the network device can initiate the ingress interface selection process among the available interfaces, as described in conjunction with FIG. 2. On the other hand, if a single interface is available, the network device may select the available interface as the new ingress interface. In the example in FIG. 1A, upon detecting the unavailability associated with ingress interface 142, network device 108 can select ingress interface 144 as the new ingress interface. The network device can then reprogram the forwarding hardware to update the static multicast route with the new ingress interface (e.g., entry 182 in forwarding hardware 140 of FIG. 1A can be updated with ingress interface 144) (operation 506).

Figure 6:
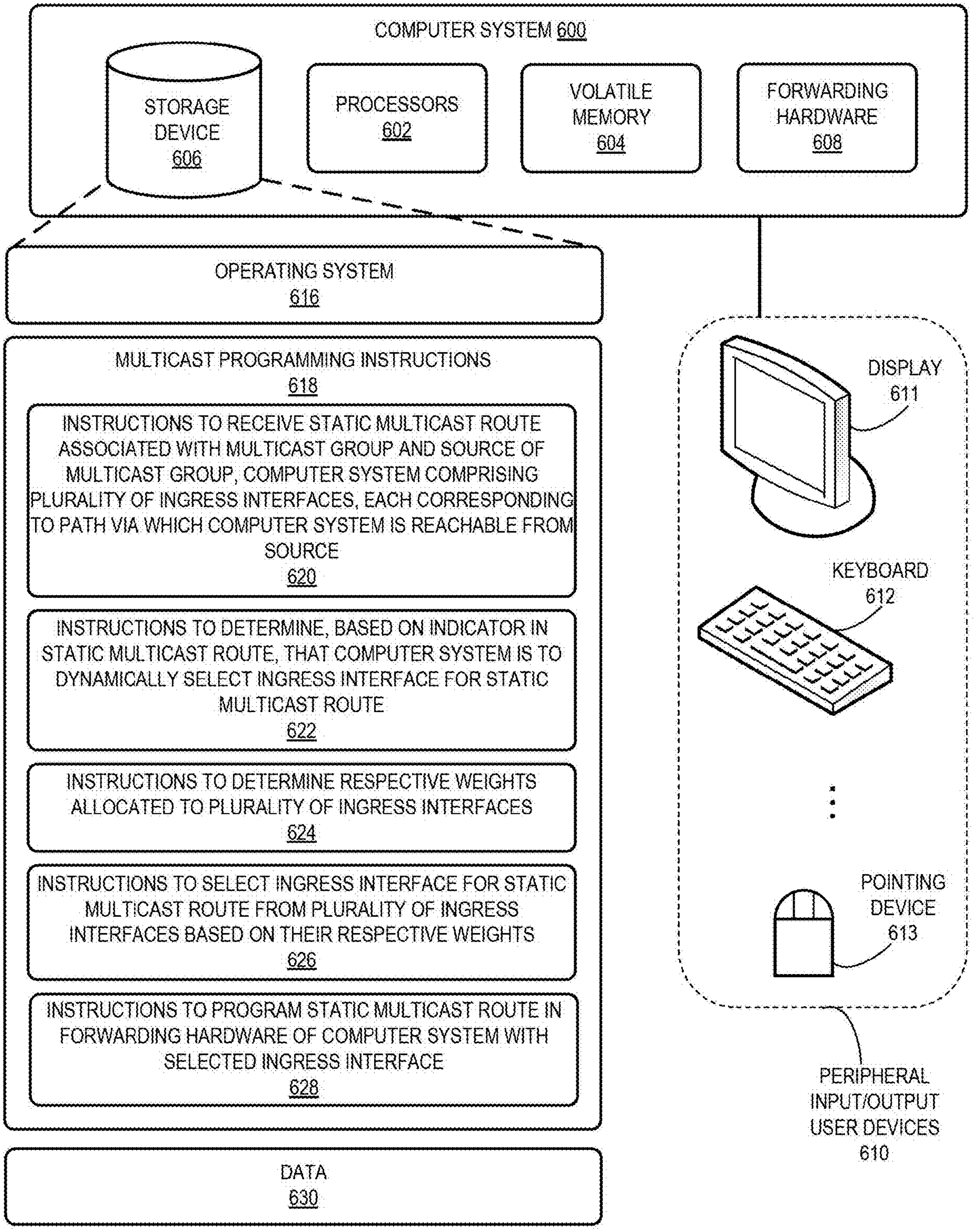
FIG. 6 illustrates an example of a computing system facilitating efficient programming of static multicast routes in a load-balanced network, in accordance with an aspect of the present application.

FIG. 6 illustrates an example of a computing system facilitating efficient programming of static multicast routes in a load-balanced network, in accordance with an aspect of the present application. Computer system 600 includes one or more processors 602, a memory 604, a storage device 606, and forwarding hardware 608. Processors 602 can include one or more processing resources, such as processor cores, GPUs, and TPUs. Memory 604 can include a volatile memory (e.g., random access memory (RAM)) that serves as a managed memory and can be used to store one or more memory pools. Furthermore, computer system 600 can be coupled to peripheral I/O user devices 610 (e.g., a display device 611, a keyboard 612, and a pointing device 613). forwarding hardware 608 can include a TCAM. Storage device 606 includes a non-transitory computer-readable storage medium and stores an operating system 616, multicast programming instructions 618, and data 630. Computer system 600 may include fewer or more entities or instructions than those shown in FIG. 6.

Multicast programming instructions 618 can include instructions, which when executed by computer system 600, can cause computer system 600 to perform methods and/or processes described in this disclosure. Computer system 600 can be a network device, such as network device 108 in FIGS. 1A and 1B. Specifically, multicast programming instructions 618 may include instructions 620 to receive a static multicast route associated with a multicast group and the source of the multicast group. Here, computer system 600 can comprise a plurality of ingress interfaces, each corresponding to a path via which computer system 600 is reachable from the source. In the example in FIG. 1A, network device 108 can receive a static multicast route 150 associated with a multicast group 110 and source 112, which can be reachable from at least two paths corresponding to a plurality of ingress interfaces 142 and 144 of network device 108.

Multicast programming instructions 618 may also include instructions 622 to determine, based on an indicator in the static multicast route, that computer system 600 is to dynamically select an ingress interface for the static multicast route. An example of the indicator can be indicator 170 in static multicast route 150 in FIG. 1A. Based on indicator 170, network device 108 can determine that it is to select an ingress interface for static multicast route 150 from interfaces 142 and 144. Furthermore, multicast programming instructions 618 may also include instructions 624 to determine respective weights allocated to the plurality of ingress interfaces (e.g., weights 172 and 174 allocated to interfaces 142 and 144, respectively, in FIG. 1A).

Multicast programming instructions 618 may include instructions 626 to select the ingress interface for the static multicast route from the plurality of ingress interfaces based on their respective weights. For example, network device 108 can select interface 142 for multicast group 110 in FIG. 1A and interface 144 for multicast group 190 in FIG. 1B based on weights 172 and 174. Moreover, multicast programming instructions 618 may include instructions 628 to program the static multicast route in forwarding hardware 608 of computer system 600 with the selected ingress interface. Here, programming forwarding hardware 608 can include generating a static multicast route entry (e.g., a TCAM entry) in forwarding hardware 608. In the example in FIG. 1A, network device 108 can program static multicast route 150 in forwarding hardware 140 by generating a corresponding entry 182 in forwarding hardware 140 with selected interface 142.

Data 630 can include any data that is required as input, or that is generated as output by the methods, operations, communications, and/or processes described in this disclosure. Specifically, data 630 can include static multicast routes associated with corresponding multicast groups and sources. Data 630 can also include respective values of the weights allocated to the plurality of ingress interfaces.

Computer system 600 and multicast programming instructions 618 may include more instructions than those shown in FIG. 6. For example, multicast programming instructions 618 can also store instructions for selecting the RPF interface (e.g., interface 142) as the ingress interface if weights 172 and 174 of FIG. 1A have an equal value; selecting interface 144 as the ingress interface since weight 174 has a lesser value than weight 174 of FIG. 1B; selecting the RPF interface as the ingress interface in the absence of ECMPs associated with network device 200 of FIG. 2; reselecting the ingress interface among the available ingress interfaces of network device 200 of FIG. 2, the operations depicted in the flowcharts of FIGS. 3A, 3B, 3C, 4, and 5; and the instructions of non-transitory CRM 700 in FIG. 7.

FIG. 7 illustrates an example of a CRM facilitating efficient programming of static multicast routes in a load-balanced network, in accordance with an aspect of the present application. CRM 700 can include one or more non-transitory computer-readable mediums or devices storing instructions that when executed by a computer or processor cause the computer or processor to perform a method. Therefore, the instructions in CRM 700 can be stored in one or more non-transitory computer-readable mediums or devices. CRM 700 can store instructions 710 to receive, by a network device, a static multicast route associated with a multicast group and the source of the multicast group. Here, the network device can comprise a plurality of ingress interfaces, each corresponding to a path via which the network device is reachable from the source. In the example in FIG. 1A, network device 108, which can include ingress interfaces 142 and 144, can receive a static multicast route 150.

CRM 700 can also include instructions 712 to determine, based on an indicator in the static multicast route, that the network device is to dynamically select an ingress interface for the static multicast route. An example of the indicator can be indicator 170 in static multicast route 150 in FIG. 1A. CRM 700 can include instructions 714 to determine respective weights allocated to the plurality of ingress interfaces (e.g., weights 172 and 174 allocated to interfaces 142 and 144, respectively, in FIG. 1A).

CRM 700 can additionally include instructions 716 to select the ingress interface for the static multicast route from the plurality of ingress interfaces based on their respective weights. For example, network device 108 can select the ingress interface from interfaces 142 and 144 based on their respective weights 172 and 174 in FIGS. 1A and 1B. CRM 700 can further include instructions 718 to program the static multicast route in the forwarding hardware of the network device with the selected ingress interface. In the example in FIG. 1A, network device 108 can program static multicast route 150 in forwarding hardware 140 by generating a corresponding entry 182 in forwarding hardware 140 with selected interface 142.

CRM 700 may include more instructions than those shown in FIG. 7. For example, CRM 700 can also store instructions for selecting the RPF interface (e.g., interface 142) as the ingress interface if weights 172 and 174 of FIG. 1A have an equal value; selecting interface 144 as the ingress interface since weight 174 has a lesser value than weight 174 of FIG. 1B; selecting the RPF interface as the ingress interface in the absence of ECMPs associated with network device 200 of FIG. 2; reselecting the ingress interface among the available ingress interfaces of network device 200 of FIG. 2, the operations depicted in the flowcharts of FIGS. 3A, 3B, 3C, 4, and 5; and the instructions of computer system 600 in FIG. 6.

The description herein is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

One aspect of the present technology can provide a network device in a network. During operation, the network device can receive a static multicast route associated with a multicast group and a source of the multicast group. Here, the network device can include a plurality of ingress interfaces, each corresponding to a path via which the network device is reachable from the source. The network device can determine, based on an indicator in the static multicast route, that the network device is to dynamically select an ingress interface for the static multicast route. The network device can then determine respective weights allocated to the plurality of ingress interfaces and select the ingress interface for the static multicast route from the plurality of ingress interfaces based on their respective weights. Subsequently, the network device can program the static multicast route in forwarding hardware of the network device with the selected ingress interface.

In a variation on this aspect, if the weights are equal, the network device can select an RPF interface associated with the source as the ingress interface of the static multicast route. On the other hand, if the weights are unequal, the network device can select an interface with a lowest weight as the ingress interface of the static multicast route.

In a further variation, the network device can increment a weight of the selected ingress interface.

In a variation on this aspect, the network device can receive multicast traffic from the source at the plurality of ingress interfaces. The network device can then forward, to a requesting host, the received multicast traffic based on the programmed static multicast route in the forwarding hardware.

In a further variation, the network device can discard the multicast traffic received at an unselected ingress interface of the plurality of ingress interfaces.

In a variation on this aspect, the plurality of ingress interfaces can correspond to equal-cost paths between the source and the network device.

In a variation on this aspect, the network device can determine an unavailability associated with the selected ingress interface. The network device can then select a new ingress interface for the static multicast route from available interfaces of the plurality of ingress interfaces. Subsequently, the network device can reprogram the forwarding hardware to update the static multicast route with the new ingress interface.

In a further variation, the network device can select the new ingress interface is based on one of: respective weights allocated to the available interfaces of the plurality of ingress interfaces and a single available interface of the plurality of ingress interfaces.

In a variation on this aspect, the network device can receive a configuration command comprising the static multicast route with the indicator. The network device can then detect the indicator in the configuration command and select the ingress interface for the static multicast route from the plurality of ingress interfaces.

In a further variation, the indicator can specify an RPF interface as the ingress interface for the source in the configuration command.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:

receiving, by a network device in a network, a static multicast route associated with a multicast group and a source of the multicast group, the network device comprising a plurality of ingress interfaces, each corresponding to a path via which the network device is reachable from the source, and the static multicast route comprising an indicator indicating that the network device is to dynamically select an ingress interface for the static multicast route;

determining respective weights allocated to the plurality of ingress interfaces;

based on a determination that the weights are equal, selecting, from the plurality of ingress interfaces, a reverse-path forwarding (RPF) interface associated with the source as the ingress interface for the static multicast route;

based on a determination that the weights are unequal, selecting an interface with a lowest weight as the ingress interface of the static multicast route; and programming the static multicast route in forwarding hardware of the network device with the selected ingress interface.

2. The method of claim 1, further comprising incrementing a weight of the selected ingress interface.

3. The method of claim 1, further comprising:

receiving multicast traffic from the source at the plurality of ingress interfaces; and forwarding, to a requesting host, the received multicast traffic based on the programmed static multicast route in the forwarding hardware.

4. The method of claim 3, further comprising discarding the multicast traffic received at an unselected ingress interface of the plurality of ingress interfaces.

5. The method of claim 1, wherein the plurality of ingress interfaces corresponds to equal-cost paths between the source and the network device.

6. The method of claim 1, further comprising:

determining an unavailability associated with the selected ingress interface;

selecting a new ingress interface for the static multicast route from available interfaces of the plurality of ingress interfaces; and reprogramming the forwarding hardware to update the static multicast route with the new ingress interface.

7. The method of claim 6, wherein selecting the new ingress interface is based on one of:

respective weights allocated to the available interfaces of the plurality of ingress interfaces; and a single available interface of the plurality of ingress interfaces.

8. The method of claim 1, further comprising:

receiving, by the network device, a configuration command comprising the static multicast route with the indicator;

detecting the indicator in the configuration command; and selecting the ingress interface for the static multicast route from the plurality of ingress interfaces.

9. The method of claim 8, wherein the indicator specifies an RPF interface as the ingress interface for the source in the configuration command.

10. A non-transitory computer-readable storage medium storing instructions to:

receive, at a network device in a network, a static multicast route associated with a multicast group and a source of the multicast group, the network device comprising a plurality of ingress interfaces, each corresponding to a path via which the network device is reachable from the source, and the static multicast route comprising an indicator indicating that the network device is to dynamically select an ingress interface for the static multicast route;

determine respective weights allocated to the plurality of ingress interfaces;

based on a determination that the weights are equal, select, from the plurality of ingress interfaces, a reverse-path forwarding (RPF) interface associated with the source as the ingress interface for the static multicast route from the plurality of ingress interfaces based on their respective weights;

based on a determination that the weights are unequal, select an interface with a lowest weight as the ingress interface of the static multicast route; and program the static multicast route in forwarding hardware of the network device with the selected ingress interface.

11. The non-transitory computer-readable storage medium of claim 10, wherein the instructions are further to increment a weight of the selected ingress interface.

12. The non-transitory computer-readable storage medium of claim 10, wherein the instructions are further to:

receive multicast traffic from the source at the plurality of ingress interfaces; and forward, to a requesting host, the received multicast traffic based on the programmed static multicast route in the forwarding hardware.

13. The non-transitory computer-readable storage medium of claim 12, wherein the instructions are further to discard the multicast traffic received at an unselected ingress interface of the plurality of ingress interfaces.

14. The non-transitory computer-readable storage medium of claim 10, wherein the plurality of ingress interfaces corresponds to equal-cost paths between the source and the network device.

15. The non-transitory computer-readable storage medium of claim 10, wherein the instructions are further to:

determine an unavailability associated with the selected ingress interface;

select a new ingress interface for the static multicast route from available interfaces of the plurality of ingress interfaces; and reprogram the forwarding hardware to update the static multicast route with the new ingress interface.

16. The non-transitory computer-readable storage medium of claim 15, wherein the network device is to select the new ingress interface based on one of:

respective weights allocated to the available interfaces of the plurality of ingress interfaces; and a single available interface of the plurality of ingress interfaces.

17. The non-transitory computer-readable storage medium of claim 10, wherein the instructions are further to:

receive, by the network device, a configuration command comprising the static multicast route with the indicator;

detect the indicator in the configuration command; and select the ingress interface for the static multicast route from the plurality of ingress interfaces.

18. A computer system, comprising:

one or more processing resources;

forwarding hardware; and a non-transitory computer-readable storage medium storing instructions that when executed by the one or more processing resourced cause the computer system to:

receive a static multicast route associated with a multicast group and a source of the multicast group, the computer system comprising a plurality of ingress interfaces, each corresponding to a path via which the computer system is reachable from the source, and the static multicast route comprising an indicator indicating that the network device is to dynamically select an ingress interface for the static multicast route;

determine respective weights allocated to the plurality of ingress interfaces;

based on a determination that the weights are equal, select, from the plurality of ingress interfaces, a reverse-path forwarding (RPF) interface associated with the source as the ingress interface for the static multicast route;

based on a determination that the weights are unequal, select an interface with a lowest weight as the ingress interface of the static multicast route; and program the static multicast route in the forwarding hardware with the selected ingress interface.

* * * * *